Dec. 30, 1947.  R. A. CHADWICK, JR  2,433,598
LOADING AND UNLOADING MECHANISM FOR MOTOR VEHICLES
Filed Sept. 23, 1944
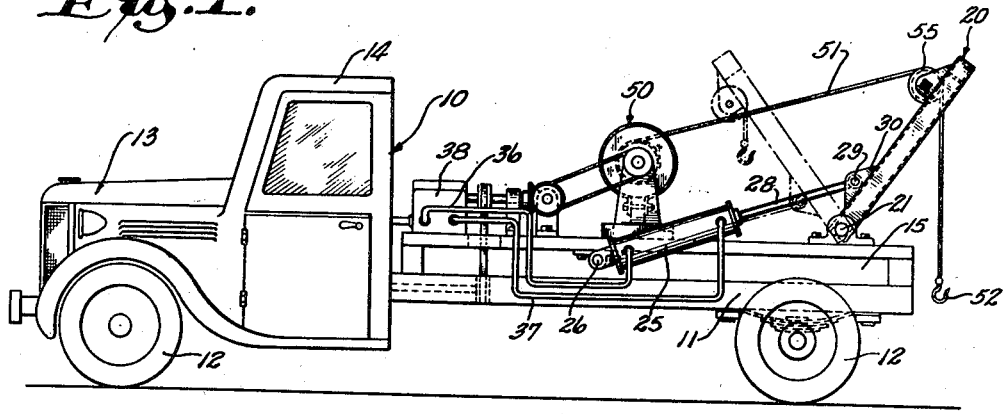
Fig. 1.
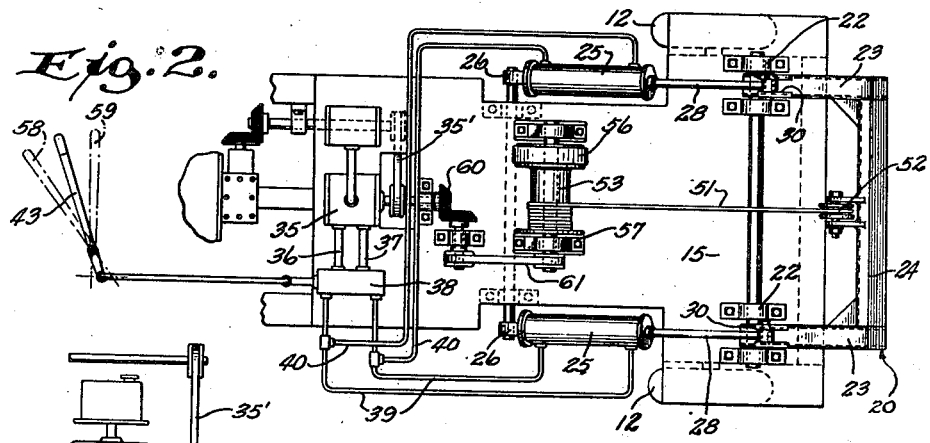
Fig. 2.
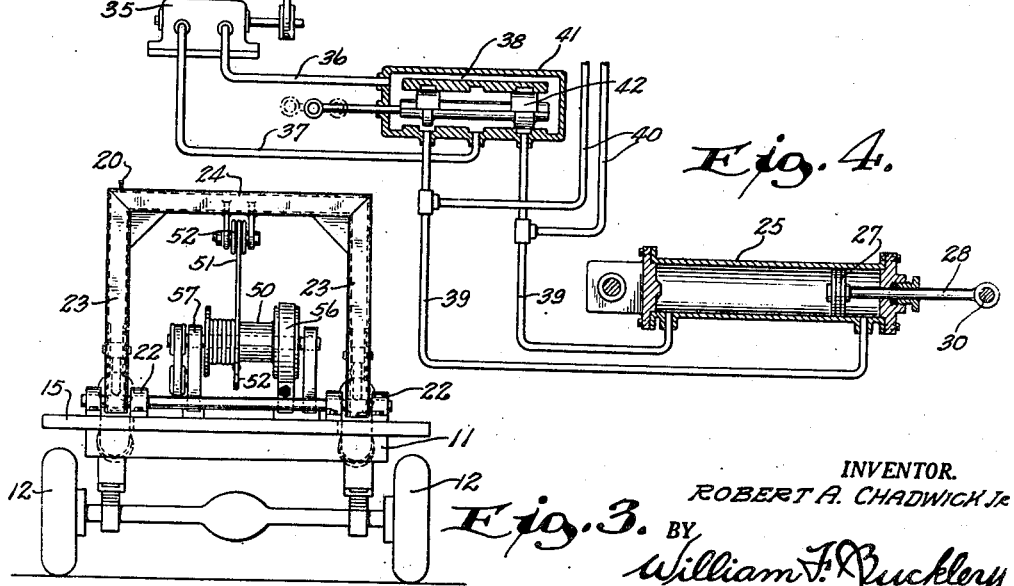
Fig. 4.
Fig. 3.
INVENTOR.
ROBERT A. CHADWICK Jr.
BY
William F. Buckley
ATTORNEYS.

Patented Dec. 30, 1947

2,433,598

UNITED STATES PATENT OFFICE 2,433,598

LOADING AND UNLOADING MECHANISM FOR MOTOR VEHICLES

Robert A. Chadwick, Jr., Milwaukee, Wis.

Application September 23, 1944, Serial No. 555,467

2 Claims. (Cl. 212—8)

This invention relates to a loading and unloading mechanism for motor vehicles designed and adapted to lift heavy loads on the ground, then translate or swing them to a position overlying the floor or the body of the vehicle, and finally to deposit them on the said floor. This, of course, is descriptive of the loading operation. For unloading the action is reversed, the load being first lifted from the floor or the body of the vehicle, then swung rearwardly to a point overlying the ground, and then lowered to the ground or to any selected point of deposit.

An object of the invention is to provide a loading and unloading mechanism of this character which is closely and compactly organized, strong and rugged in construction, readily and easily controllable by the operator of the vehicle, and reliable and efficient in operation.

These objects of the invention and other ancillary advantages are attained by the mechanism, construction, and arrangement illustrated in the accompanying drawings forming part hereof, in which:

Fig. 1 is a view in side elevation and largely diagrammatic in character and illustrating a motor vehicle or truck equipped with a loading and unloading mechanism embodying the present invention;

Fig. 2 is a fragmentary view in top plan showing the layout of the loading and unloading mechanism, the power operated mechanism for swinging the boom and illustrating generally how the winch which controls the load line and lift hook may be driven from the power plant of the vehicle;

Fig. 3 is a view in rear elevation of the motor vehicle equipped with a loading and unloading mechanism embodying the present invention; and Fig. 4 is a diagrammatic layout illustrating one way of hydraulically operating the pistons and cylinders utilized for swinging the boom assembly.

Referring to the drawing, the numeral 10 designates generally a motor driven truck with which the loading and unloading mechanism constituting the present invention is combined. The truck 10 may be of any standard or conventional construction and has the usual chassis 11 supported on wheels 12. It is powered by the usual engine 13 and ordinarily may be equipped with a cab 14 for the driver or operator of the vehicle. The truck 10 has the usual floor platform 15 which is securely attached to the chassis 11.

The loading and unloading mechanism combined with the rear end of the truck comprises generally a rectangular frame, designated as a whole at 20. This frame 20, which is, and operates as a boom assembly, has its lower side constituted of a shaft 21 rotatably supported in bearings 22 carried by and secured to the floor or platform of the truck. This rectangular boom assembly also includes lift arms 23, swingable in vertical planes and which are cross connected at their upper ends by a cross member 24 which constitutes the top member of the frame.

The frame described is swingable from a position projecting from the rear end of the vehicle and overlying the ground to a forward position where it overlies the floor or platform 15 of the vehicle, the latter position being illustrated in dotted lines in Fig. 1.

Means is provided for so swinging the rectangular frame or boom assembly 20 and for holding it in any of the positions to which it may be adjusted.

This means may conveniently be constituted of two hydraulic motors of the piston and cylinder type. As illustrated in the drawing, each such motor may comprise a cylinder 25 pivotally anchored as at 26 to one of the main structural elements of the chassis, preferably one of the longitudinal side frame members thereof. A piston 27 is reciprocable in each cylinder 25. Each piston 27 is provided with a piston rod 28 and each piston rod 28 is pivotally connected as at 29 to a bracket structure 30 provided therefor on its lift arm of the boom assembly.

A suitable hydraulic circuit is provided for supplying the motive fluid, usually oil, to the opposite ends of the cylinders 25 of the motors which swing the boom assembly 20 so that provision is made for the application of pressure to and the exhaust of the motive fluid from the opposite ends of the cylinders 25 of the motors, this, of course, to provide for the reciprocations of the pistons 27 of the motors and the consequent swinging of the boom assembly 20.

This hydraulic circuit is diagrammatically illustrated in Figs. 2 and 4. It comprises a pump 35 driven as at 35' from the power plant of the truck and having its inlet and its outlet connected by pipe lines 36 and 37 to a four-way distributing valve 38. The ports of the valve 38 are in turn connected by pipe lines 39 and suitable branches 40 to the opposite ends of the cylinders 25.

The distributing valve 38 includes, of course, suitable casing 41 and a piston valve 42 (see Fig. 4). The piston valve 42 is reciprocal in the chamber of the valve casing to control the distribution of the motive medium. Its position is controllable at will since it is suitably interconnected by a system of links and levers to a hand lever 43 which is in a convenient position to be manipulated by the operator of the truck.

Combined with the boom assembly 20 previously described is a winch designated generally at 50, a load line designated at 51 and a lift hook designated at 52. The winch 50 may be of any suitable or standard construction and, of course, is fixedly secured to the floor or platform of the truck, preferably as far forwardly as is practical. The load line or lift line 51 is anchored to and reeved about the drum 53 of the winch and extends up over a pulley 55 suitably suspended from the upper cross member 24 of the boom assembly. The winch 53 is equipped with a suitable clutch 56 and a suitable brake 57, also manually controllable by levers 58 and 59.

The winch 50 is powered from the power take-off of the power plant or engine of the motor vehicle. The way in which this power is transmitted to the drum of the winch through its clutch is illustrated diagrammatically in Fig. 2 as comprising a gear train 60 inclusive of intermeshing beveled gearing and a friction drive 61 receiving its motion from the positive beveled gear train and driving the drum of the winch. This motion transmission train may also include a gear transmission of the selective type and one which provides for reversal.

In the operation of the mechanism the load is suitably hitched to the lift hook 52, when this hook is suspended by the boom assembly in a position overlying the ground and rearwardly of the platform or floor of the truck. When the hitch has been made, the operator simply manipulates the appropriate controlling hand lever and causes the winch 50 to reel in the load line or lift line 51, thereby elevating the load to a point or to an elevation above the level of the floor or platform 15 of the truck. When this has been accomplished, then the operator of the vehicle manipulates the lever 43 so as to cause the hydraulic motors 25 to come into action, and this in such a way that the boom assembly 20 is swung in a counter-clockwise direction as viewed in Fig. 1. The elevated load is now translated or swung from a position from the rear end of the vehicle to a position overlying the floor or platform 15 of the body thereof. The operator may now control the winch 50 to cause it to lower the load or object being handled, onto the floor or platform of the truck.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

What I claim is:

1. In combination, a truck having a platform for receiving objects to be loaded thereon, a boom straddling said platform and pivotally mounted thereon near the rear end thereof to swing rearwardly free of the truck and to swing forwardly over the truck platform in loading and unloading operations, a hydraulic power cylinder pivotally mounted on each side of the truck platform forwardly of the boom and having its piston rod connected to the corresponding side of the boom to operate the latter, said rod being of a length to limit the movement of the boom forwardly and rearwardly to a substantially short stroke and preventing the boom from obtaining a horizontal position in service, a winch disposed forwardly of the loading space on the truck platform, and a cable operable by said winch and extending over a sheave on the boom for lifting an object relative to the platform, the said cable and winch effecting transfers of loads by operation by said boom substantially to provide a boom of lighter weight and operation by less power.

2. In combination, a truck having a platform for receiving objects to be loaded thereon, a boom straddling said platform and pivotally mounted thereon near the rear end thereof to swing rearwardly free of the truck and to swing forwardly over the truck platform in loading and unloading operations, a hydraulic power cylinder pivotally mounted on each side of the truck platform forwardly of the boom and having its piston rod connected to the corresponding side of the boom to operate the latter, a winch disposed forwardly of the loading space on the truck platform, a cable operable by said winch and extending over a sheave on the boom for lifting an object relative to the platform, and a single power means for supplying hydraulic power to said cylinders and for driving said winch.

ROBERT A. CHADWICK, Jr.

REFERENCES CITED

The following references are of record in the file of this patent:

UNITED STATES PATENTS

| Number | Name | Date |
|---|---|---|
| 965,493 | Williams | July 26, 1910 |
| 1,019,268 | Melzer | Mar. 5, 1912 |
| 1,238,588 | Snook | Aug. 28, 1919 |
| 1,328,793 | Hainsworth | Jan. 20, 1920 |
| 1,391,109 | Haubert | Sept. 20, 1921 |
| 1,649,574 | Conway | Nov. 15, 1927 |
| 1,817,859 | Cohen-Venezian | Aug. 4, 1931 |
| 1,906,362 | Brown | May 2, 1933 |
| 2,168,128 | Kervarrec | Aug. 1, 1939 |
| 2,281,507 | Le Tourneau | Apr. 28, 1942 |
| 2,290,738 | Chadwick | July 21, 1942 |
| 2,353,655 | Day | July 18, 1944 |